United States Patent
Rief et al.

(10) Patent No.: US 6,460,564 B1
(45) Date of Patent: Oct. 8, 2002

(54) AUTOMATIC-LOCKING SHUT-OFF VALVE FOR LIQUID SUCTION SYSTEMS

(76) Inventors: Dieter J. Rief, 2780 Bardy Rd., Santa Rosa, CA (US) 95404; Hans Schlitzer, 77 Ivan Smuts Avenue Silverfields 1740, Krugerdorp (ZA)

( * ) Notice: Subject to any disclaimer, the term of this patent is extended or adjusted under 35 U.S.C. 154(b) by 0 days.

(21) Appl. No.: 09/689,455

(22) Filed: Oct. 12, 2000

Related U.S. Application Data
(60) Provisional application No. 60/158,883, filed on Oct. 12, 1999.

(51) Int. Cl.[7] .......................... F16K 17/32; F16K 31/12; F16K 31/143
(52) U.S. Cl. ............. 137/456; 137/625.41; 137/625.46; 137/907; 251/73
(58) Field of Search ................. 137/456, 463, 137/467, 907, 625.41, 625.46; 251/73, 74

(56) References Cited

U.S. PATENT DOCUMENTS

| | | | | |
|---|---|---|---|---|
| 935,725 A | * | 10/1909 | Ainsworth | 137/463 |
| 2,081,542 A | * | 5/1937 | Kidney | 137/456 |
| 2,327,055 A | * | 8/1943 | McMahon | 137/458 |
| 3,306,317 A | * | 2/1967 | Brown | 137/458 |
| 3,429,321 A | * | 2/1969 | Thrall | 137/458 |
| 3,698,424 A | * | 10/1972 | Wiegand | 137/467 |
| 4,457,334 A | * | 7/1984 | Becker et al. | 137/463 |
| 4,470,429 A | | 9/1984 | Johnson | 137/270 |
| 4,470,660 A | | 9/1984 | Hillegonds et al. | 350/96.21 |
| 4,570,660 A | | 2/1986 | Chauvier | 137/907 |
| 4,601,307 A | * | 7/1986 | Johnson | 137/625.46 |
| 4,635,674 A | * | 1/1987 | Bajka | 137/625.46 |
| 4,766,931 A | | 8/1988 | Chauvier et al. | 137/907 |
| 4,790,344 A | | 12/1988 | Chauvier et al. | 137/907 |

* cited by examiner

*Primary Examiner*—George L. Walton
(74) *Attorney, Agent, or Firm*—Jansson, Shupe & Munger, Ltd.

(57) ABSTRACT

A rotary-plug shut-off valve (10) of the type having a valve chamber (20) with multiple inlets includes: an actuator chamber (26); a base member (36) forming (a) an end of the actuator chamber (26) and (b) a guide (44); a vacuum-reactive member (48) movable with respect to the base member (36); a spring (54) in axial compression and rotational tension between the base member (36) and the vacuum-reactive member (48) and compressible by vacuum force on the vacuum-reactive member (48); and a piston (60) affixed to the vacuum-reactive member (48) and slidable 1) with respect to the rotary plug (22) and 2) with respect to the base member guide (44), to achieve automatic shut-off when vacuum pressures in protected line are too intense. The piston (60) is (a) slidably engaged with the guide (44) in common rotational alignment therewith in a normal operating range of their relative axial positions and (b) out of sliding engagement with the guide beyond such normal operating range of relative axial positions; when beyond such range, the spring (54) automatically turns the vacuum-reactive member (48) and piston (60) and thereby the plug (22) from one inlet (18) to the other inlet (16). Preferred embodiments include an automatically-actuated vacuum-relief valve (32) to relieve vacuum pressure from the protected line after closing.

21 Claims, 5 Drawing Sheets

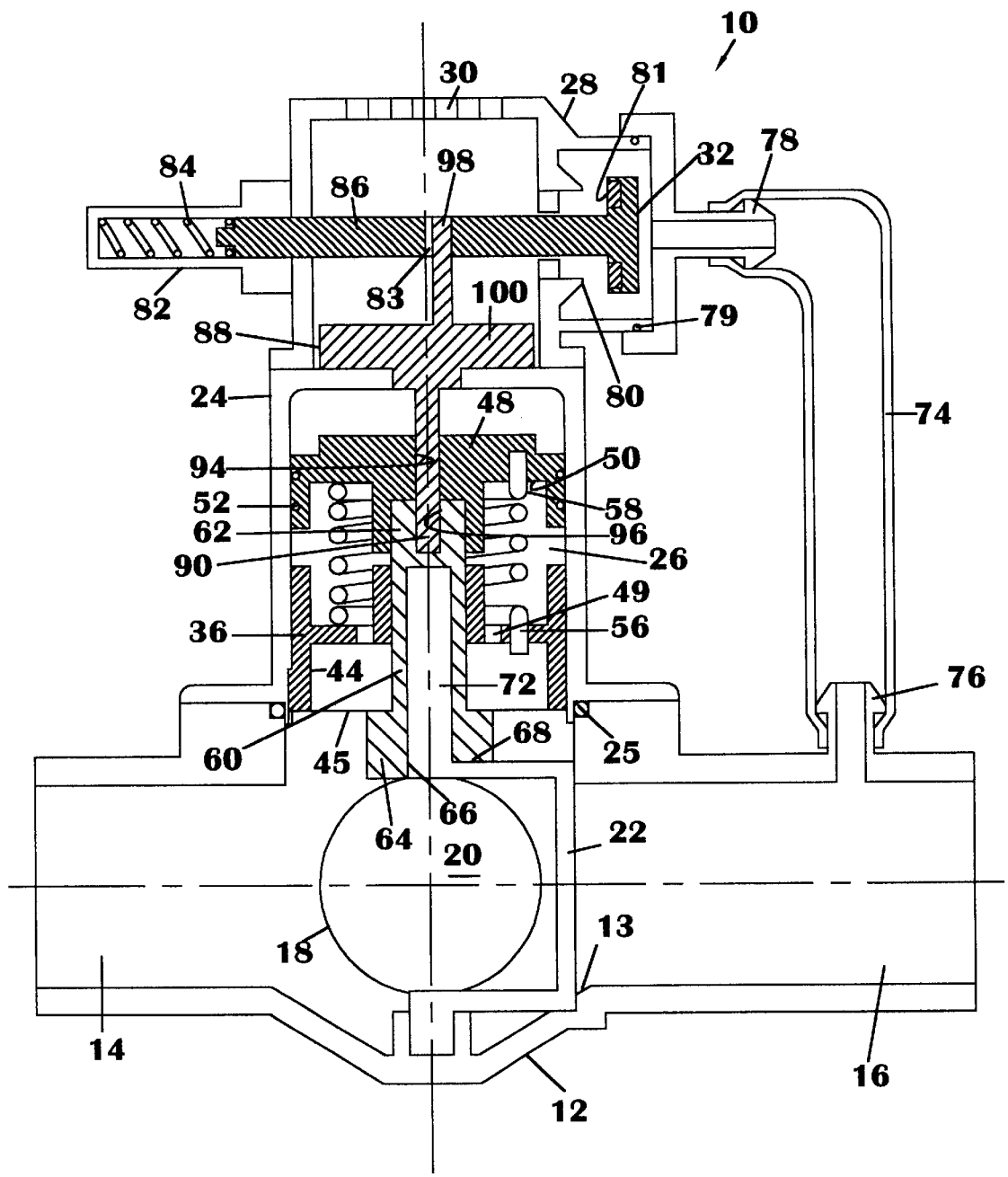
F I G . 5

AUTOMATIC-LOCKING SHUT-OFF VALVE FOR LIQUID SUCTION SYSTEMS

RELATED APPLICATIONS

This is a regular patent application based on provisional Patent Application Ser. No. 60/158,883, filed on Oct. 12, 1999 by the inventors named herein.

FIELD OF THE INVENTION

The invention is related generally to shut-off valves for liquid suction systems and, more particularly, to shut-off valves for water suction systems for swimming pools, spas and the like. Still more particularly, this invention relates to rotary-plug shut-off valves for suction cleaning systems for swimming pools, spas and the like.

BACKGROUND OF THE INVENTION

Liquid suction systems are employed in a variety of settings and for a variety of purposes. One example is the liquid suction systems which are used for swimming pools, spas and the like. Such a system typically includes a suction pump away from the pool which draws water from the pool at one or more suction ports located along the pool sidewall and/or through the main drain of the pool. A hose is typically connected to one of the sidewall ports and extends to an automatic swimming pool cleaner which draws pool water for cleaning purposes.

Typically, one or more valve mechanisms are used to determine whether water will be sucked from the pool through the main drain and/or through the side port(s). One example of such valve mechanisms is the three-way rotary-plug valve disclosed in U.S. Pat. No. 4,470,429 (Johnson). Such device is a manually-operated rotary-plug valve.

In swimming pool suction systems, when suction lines become obstructed with debris, damage to the lines and equipment may result if excessive vacuum pressures are not quickly released. Furthermore, a risk of bodily injury may exist if a vacuum or suction device comes into contact with a person. Various bypass devices have been developed to address problems of excessive vacuum due to blockage. One example is the device disclosed in U.S. Pat. No. 4,570,660 (Chauvier). Another is the automatic locking bypass valve which is disclosed in our copending U.S. patent application Ser. No. 09/327,913 (Rief et al.), filed Jun. 8, 1999.

Valve mechanisms of the prior art for controlling which lines will be open to vacuum forces, such as the rotary-plug valve of the aforementioned Johnson patent, have various shortcomings. Among these are the fact that they require manual operation, and thus fail to address problems associated with unexpected line clogging or blockage. Also, even when operated manually such devices fail to provide any vacuum relief in a line which has been manually shut off because of line blockage. In such cases, it may become necessary to turn off the pump and reopen the line in order to relieve the vacuum force remaining in the line. Furthermore, while such devices can be locked into a predetermined position, such locking requires an additional manual step, beyond merely closing a line.

The prior art fails to disclose or suggest a rotary-plug shut-off valve which overcomes these problems and shortcomings.

OBJECTS OF THE INVENTION

It is an object of this invention to provide an improved rotary-plug shut-off valve overcoming some of the problems and shortcomings of the prior art.

Another object of this invention to provide an improved rotary-plug shut-off valve which can operate automatically, i.e., which automatically shuts off a line when vacuum pressure in such line exceeds a predetermined acceptable range of vacuum pressures.

Another object of this invention is to provide an improved rotary-plug shut-off valve which automatically locks in a shut-off position in response to unacceptable line pressures.

Another object of the invention is to provide an improved rotary-plug shut-off valve which automatically relieves the vacuum pressure in a closed line after such line has been shut off.

Yet another object of the invention is to provide a rotary-plug shut-off valve which shuts off a flow line due to unacceptable vacuum pressure therein due to blockage and simultaneously relieves the unacceptable vacuum pressure in the line upon line shut-off.

Another object of the invention is to provide an improved rotary-plug shut-off valve which, although it automatically shuts off a line and automatically relieves line pressure, has a override for manual operation and resetting.

Still another object of the invention is to provide an improved automatic rotary-plug shut-off valve mechanism which can be used to retrofit a standard rotary-plug shut-off valve.

Another object of the invention is to provide an improved rotary-plug shut-off valve which is simple in construction and easily maintained.

These and other objects of the invention will be apparent from the following descriptions and from the drawings.

SUMMARY OF THE INVENTION

This invention is an improved shut-off valve for use in liquid suction systems. More specifically, this invention is an improved rotary-plug shut-off valve of the type including a multi-port valve body forming a valve chamber and having an outlet and first and second inlets, a rotary plug in the valve chamber, and an actuator to turn the plug. The improvement of this invention overcomes the aforementioned problems and shortcomings of the prior art; it is an improved shut-off valve which satisfies the objects of the invention set forth above.

The improved shut-off valve of this invention includes as its principal elements: an actuator housing; a base member; a vacuum-reactive member; a spring; and a piston. The actuator housing is affixed to the valve body adjacent to the plug, and forms an actuator chamber which is in fluid communication with the valve chamber, e.g., through openings in the base member. The base member is affixed to the actuator housing in position to form one end of the actuator chamber. The base member also forms (1) a sleeve through which a portion of the piston extends, (2) a guide which engages a portion of the piston, as hereafter explained, and (3) a first spring-abutment. The vacuum-reactive member is located within the actuator chamber and is movable toward and away from the base member, along the axis of the actuator chamber. The vacuum-reactive member also forms a second spring-abutment which is opposed to the first spring-abutment.

The aforementioned spring is in axial compression and rotational tension between the first and second spring-abutments and is compressible by vacuum force on the vacuum-reactive member. The spring, which is preferably in the form of a coiled helix, serves at the proper time to provide the turning force necessary to move the rotary plug from a position covering one inlet to the valve chamber to a position closing the other inlet to the valve chamber. As hereafter explained, the spring moves the rotary plug by acting through the vacuum-reactive member and the piston.

The piston is affixed to the vacuum-reactive member and is rotationally aligned with the plug. The piston includes a shaft which extends through the sleeve. The piston also includes an anti-rotation structure which is: (a) slidably engaged with the guide (portion of the base member) in one rotational alignment therewith when in a normal operating range of axial positions with respect thereto—i.e., when the piston anti-rotation structure and the guide (of the base member) are within a normal operating range of relative axial positions; and (b) out of sliding engagement with the guide beyond such normal operating range of relative axial positions—i.e., when the piston anti-rotation structure and the guide (of the base member) are within a normal operating range of relative axial positions.

Given these parts and relationships, when the anti-rotation structure of the piston is out of sliding engagement with the guide, and thus free to rotate, the spring rotates the vacuum-reactive member and piston. This rotation of the piston causes the plug to rotate, under the uncoiling pressure of the spring, from one inlet to the other inlet.

In highly preferred embodiments, the first and second inlets are at the ends of first and second inlet lines extending to the valve chamber, and a vacuum-relief line extends from one of the inlet lines, at a position upstream of the valve chamber, to atmosphere and a vacuum-relief valve is located in such vacuum-relief line. It is highly preferred in such embodiments to have linkage between the actuator structure and the vacuum-relief valve in order that the vacuum-relief valve is opened upon rotation of the plug—i.e., upon the shutting off of such line, referred to herein as the protected line. Such automatic relief of residual vacuum pressure, remaining in the protected line upon automatic shut-off, is an important feature of this invention.

In highly preferred embodiments of this type, the vacuum-relief valve includes a valve head and a stem attached to it, and the aforesaid linkage includes a transfer member which has proximal and distal end portions, the proximal end portion being engaged with the vacuum-reactive member and the distal end portion being engaged with the valve stem. Most preferably, the proximal end portion of the transfer member is in rotational alignment and slidable engagement with the vacuum-reactive member along the axis thereof. And, in highly preferred embodiments, the valve stem preferably has an aperture through it to receive the distal end of the transfer member, which is in the form of a rod that is axially offset from the axis of the vacuum-reactive member. Thus, when the vacuum-reactive member rotates, the transfer member also rotates, and, because it is an off-axis distal rod which is in the valve stem aperture, rotation of the transfer member moves the valve stem (i.e., along its own axis) to operate the vacuum-relief valve.

A vacuum-relief housing is preferably attached to the actuator housing and serves to house the transfer member and the vacuum-relief valve. Such vacuum-relief housing also forms a valve seat for the vacuum-relief valve, forms air intake vents to atmosphere, and also supports the valve stem.

It is highly preferred that a reset/override lever be attached to the transfer member to facilitate manual resetting of the rotary-plug shut-off valve. Such lever serves to manually reset the rotary-plug shut-off valve to again open the protected line for flow vacuum-initiated flow. Furthermore, such lever can be used to intentionally close the protected line whenever that is desired.

Referring again to those elements of the inventive rotary-plug shut-off valve which are within the actuator chamber and/or the valve chamber, it is highly preferred that the rotary plug and the piston have first and second non-rotational mating surfaces, respectively, i.e., mating surfaces which hold the piston and the plug in fixed rotational orientation with respect to one another—at least when the anti-rotation structure of the piston is out of sliding engagement with the guide of the base member such that rotation of the piston rotates the rotary plug.

In the most preferred of such embodiments, the first non-rotational mating surface is a piston-mating surface on the plug which is outside the actuator chamber. The piston has a piston head, also outside the actuator chamber, and the second non-rotational mating surface is a plug-mating surface on the piston head, such plug-mating surface being configured to engage the piston-mating surface of the plug. Such mating engagement causes rotation of the piston to rotate the plug.

One alternative arrangement of the first and second non-rotational mating surfaces of the rotary plug and piston, respectively, involves a rotary-plug shaft which extends slidably into a cavity within the piston shaft. In such embodiments (not illustrated herein), the rotary-plug shaft and the cavity into which it extends are non-circular in cross-section, such that turning of the piston, when it is can occur, also turns the rotary plug. In such embodiment, the non-rotational mating (to allow rotation of the piston) exists at all times, not simply when the aforementioned anti-rotation structure of the piston is out of sliding engagement with the guide of the base member.

In certain highly preferred embodiments, the anti-rotation structure of the piston mentioned earlier herein involves other structures of the piston head, which is outside the actuator chamber, and characteristics of the guide (i.e., characteristics of the fixed-position base member). More specifically, the guide of the fixed position base member faces the valve chamber and is shaped to receive and hold the piston head in the aforesaid one rotational alignment therewith; the outside edge (perimeter) of the piston head is configured to mate with the guide.

When the piston, and thus the piston head, are moved axially, whether by the application of vacuum pressure on the vacuum-reactive surface or by depression of the vacuum-reactive surface and piston by depression of the manual reset/override lever, and the piston-head movement causes it to slide beyond (i.e., out of) its non-rotational engagement with the guide, then the rotational tension of the spring causes the vacuum-reactive surface and the piston head to quickly and firmly rotate, preferably about 90°. And, as already noted, this causes rotation of the rotary plug.

Most preferably, the preferred form of non-rotational engagement of the piston head and the base-member guide are combined with the preferred form of the piston with the rotary plug. That is, as earlier described herein, the piston head and the plug have plug-mating and piston-mating surfaces, respectively, to hold the piston and the plug in fixed rotational orientation so that rotation of the piston rotates the plug.

In somewhat broader terms, the rotary-plug shut-off valve of this invention includes: an actuator housing affixed to the valve body adjacent to the plug and forming an actuator chamber communicating with the valve chamber; a base member attached to the actuator housing in fixed axial position and forming (a) an end of the actuator chamber, (b) a sleeve, (c) a guide, and (d) a first spring-abutment; a vacuum-reactive member within the actuator chamber, movable toward and away from the base member, and supported by spring pressure at a position away from the base member such that it is movable toward the base member by sufficient vacuum force on the vacuum-reactive member; a piston attached to the vacuum-reactive member, rotationally aligned with the plug, and having a (a) shaft extending through the sleeve and (b) an anti-rotation structure which is (1) slidably engaged with the guide in one rotational alignment therewith in a normal operating range of axial positions with respect thereto and (2) out of sliding engagement with the guide beyond such normal operating range; and a spring in rotational tension positioned and secured to rotate at least the piston and thereby rotate the plug from one inlet to the other inlet when the piston anti-rotation structure is out of sliding engagement with the guide.

While a specific single spring was referred to above and is illustrated herein, a variety of other spring arrangements are possible to provide (1) the necessary spring pressure to resist vacuum-induced movement of the vacuum-reactive member and (2) the necessary torsional force to rotate parts when necessary. For example, one or more springs in compression can be used to resist the vacuum-induced movement of the vacuum-reactive member, while another spring could be used to provide torsional force. The single spring referred above is highly preferred and advantageous.

In still broader terms, the rotary-plug shut-off valve of this invention includes: an actuator housing affixed to the valve body adjacent to the plug; a vacuum-sensing-and-reacting device secured with respect to the actuator housing and in communication with the valve chamber; an actuator in the actuator housing, engageable with the rotary plug, and linked for control to the vacuum-sensing-and-reacting device thereby to rotate the plug from one inlet to the other inlet when the vacuum-sensing-and-reacting device senses excessive vacuum; a vacuum-relief line extending from the first inlet line to atmosphere; and a vacuum-relief valve in the vacuum-relief line.

Preferred embodiments of such rotary-plug shut-off valve were described in some detail above. One alternative embodiment involves placement of a vacuum sensor in the valve chamber, such vacuum sensor being set at a predetermined pressure level to initiate the actuator. The actuator may be in the form of an electric motor within the actuator housing. As in other embodiments described above, the vacuum-relief valve in an embodiment relying on sensors, motors, and the like, will be actuated simultaneously with actuation of the rotary plug. A variety of actuating and control mechanisms, including programmable controllers, can be used without departing from the spirit of this invention.

The improved rotary-plug shut-off valve of the present invention is particularly well adapted for use in a liquid suction system for swimming pools, spas and the like, particularly those in which automatic pool cleaners are used. However, applications of the invention are not limited to such applications.

BRIEF DESCRIPTION OF THE DRAWINGS

The drawings illustrate preferred embodiments which include the above-noted characteristics and features of the invention. The invention will be readily understood from the descriptions and drawings. In the drawings:

FIG. 5 is another side sectional elevation as in FIG. 3, but showing the mode of FIG. 3 after having set such mode by manual activation using the reset/override lever.

DETAILED DESCRIPTION OF PREFERRED EMBODIMENTS

Figure 1:
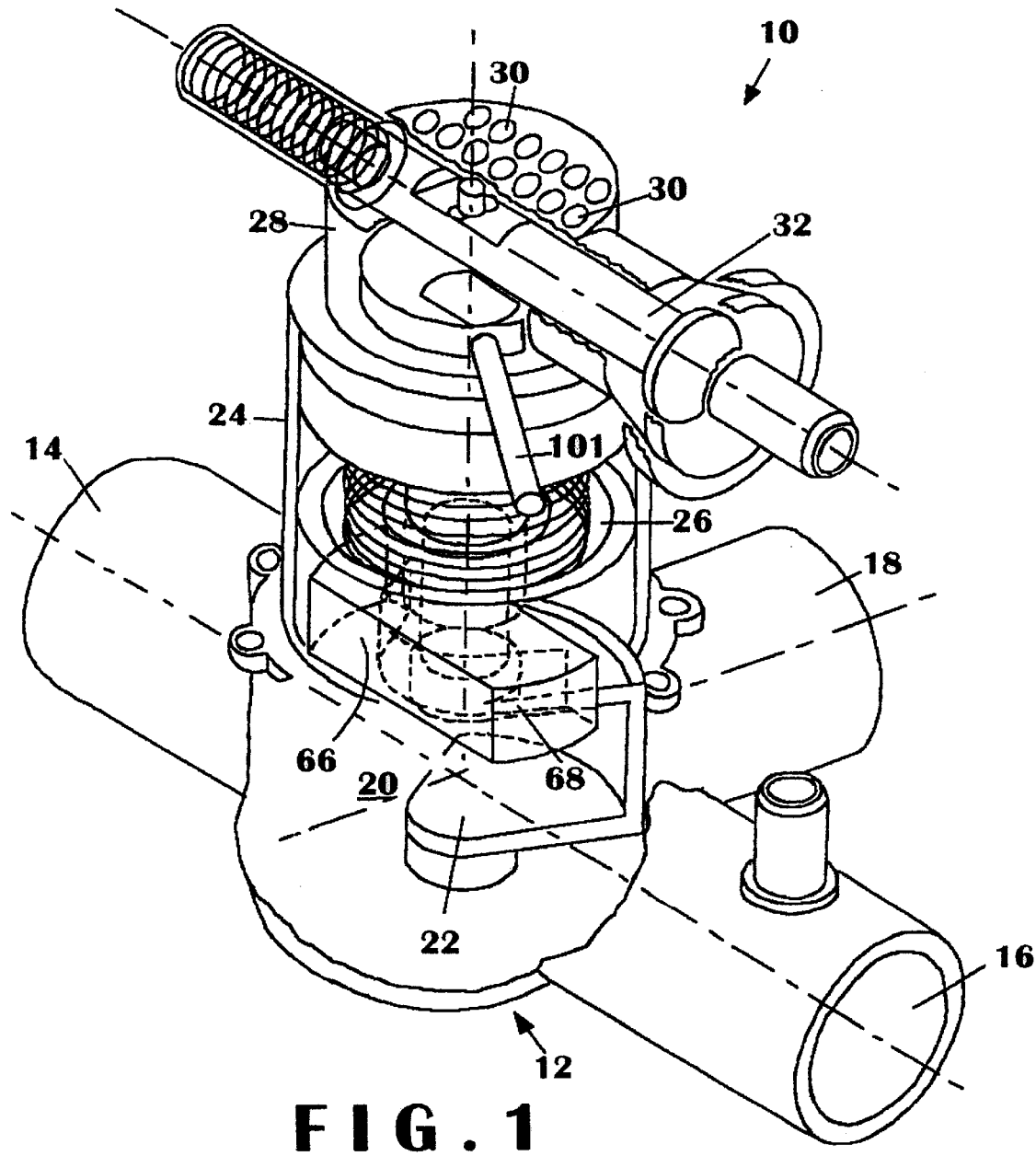
FIG. 1 is partially cutaway, partially transparent perspective view of a preferred rotary-plug shut-off valve in accordance with this invention, showing the device in a first operating mode, e.g., with the rotary plug in position allowing system flow through a protected line, such as a line serving swimming pool cleaning functions.

FIG. 1 depicts a shut-off valve in accordance with the present invention and is generally designated by the reference numeral 10. Shut-off valve 10 includes a multi-port valve body 12 with an outlet line 14 and first and second inlet lines 16 and 18, respectively. Shut-off valve 10 further includes a valve chamber 20 and a rotary plug 22 disposed therein. An actuator housing 24 is affixed to valve body 12 adjacent to rotary plug 22 and forms an actuator chamber 26 therein. An O-ring 25 (see FIGS. 2 and 3) is in sealing engagement between actuator housing 24 and valve body 12. A vacuum-relief housing 28 is attached to the top of actuator housing 24 and includes air-intake vents 30 and a vacuum-relief valve 32.

Figure 2:
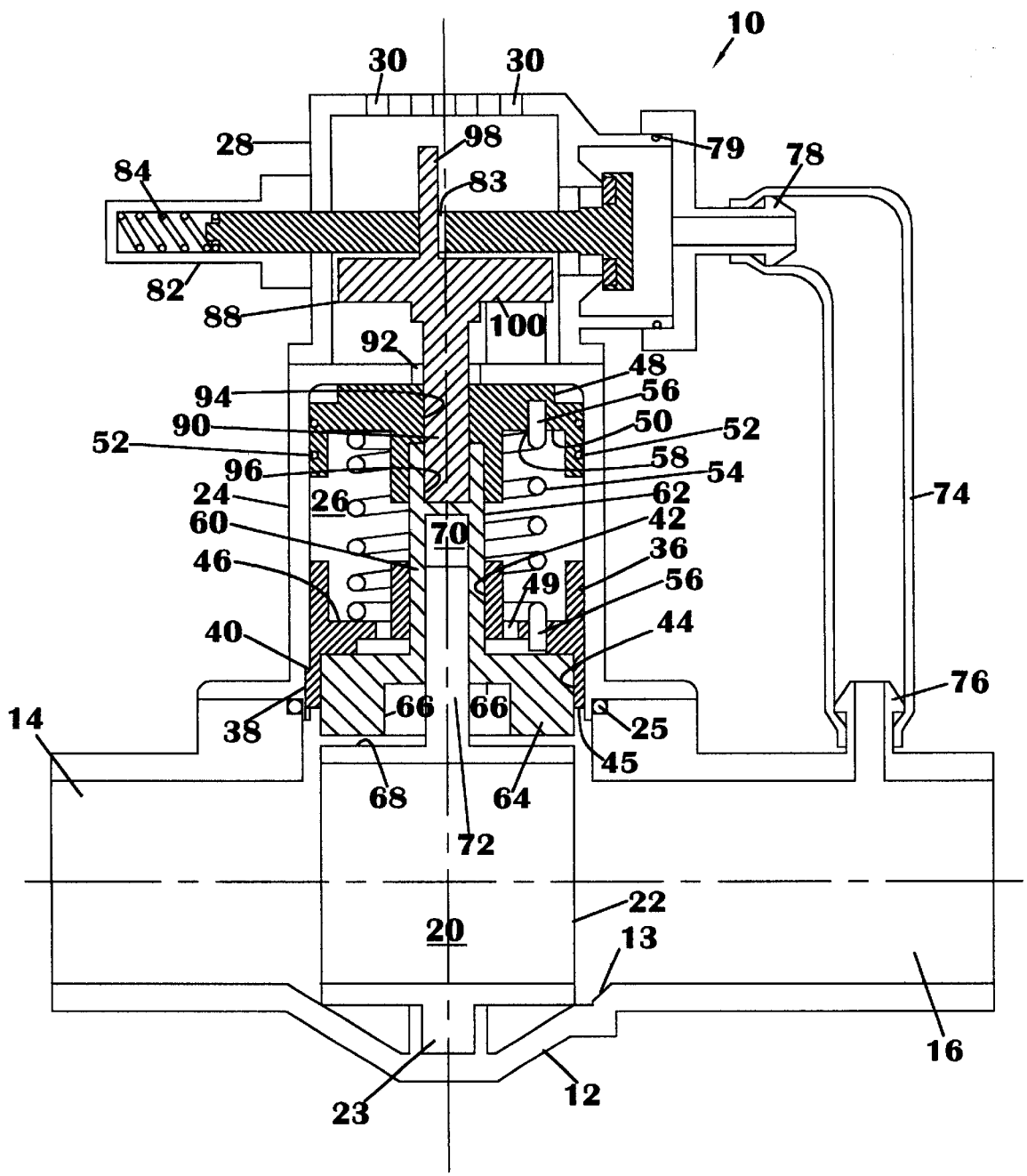
FIG. 2 is a side sectional elevation the device of FIG. 1.

In the preferred embodiment, a base member 36 is affixed in actuator housing 24 and includes a key 38 receivable in key-way 40 in actuator housing 24 as shown in FIG. 2. It can be appreciated that other methods of securing base member 36 to actuator housing 24 would be acceptable. Base member 36 is in position to form one end of actuator chamber 26 and also forms a piston sleeve 42, a guide 44 and a first spring-abutment 46. Guide 44 of base member 36 faces valve chamber 20 and terminates at edge 45.

A vacuum-reactive member 48 is located within actuator chamber 26 and is movable toward and away from base member 36 along the axis of actuator chamber 26. Actuator chamber 26 is in fluid communication with valve chamber 20 through fluid communication ports 49 located in base member 36. Vacuum-reactive member 48 forms a second spring-abutment 50 which is opposed to first spring-abutment 46. Vacuum-reactive member 48 further includes seals 52 around its periphery to seal system vacuum forces from leakage.

A coil spring 54 is disposed between first spring-abutment 46 and second spring-abutment 50 and is in axial compression and rotational tension. Spring 54 is compressible by vacuum force on vacuum-reactive member 48. Spring 54 has end portions 56 which are received within spring-retaining apertures 58 located in base member 36 and vacuum-reactive member 48 to secure spring 54 in rotational tension.

Shut-off valve 10 further includes a piston 60 having a shaft 62 which extends through piston sleeve 42 of base member 36 and is affixed to vacuum-reactive member 48. In a highly preferred embodiment, piston 60 also includes a non-circular piston head 64 outside actuator chamber 26 which is received in guide 44 of base member 36 in one rotational alignment therewith.

Figure 3:
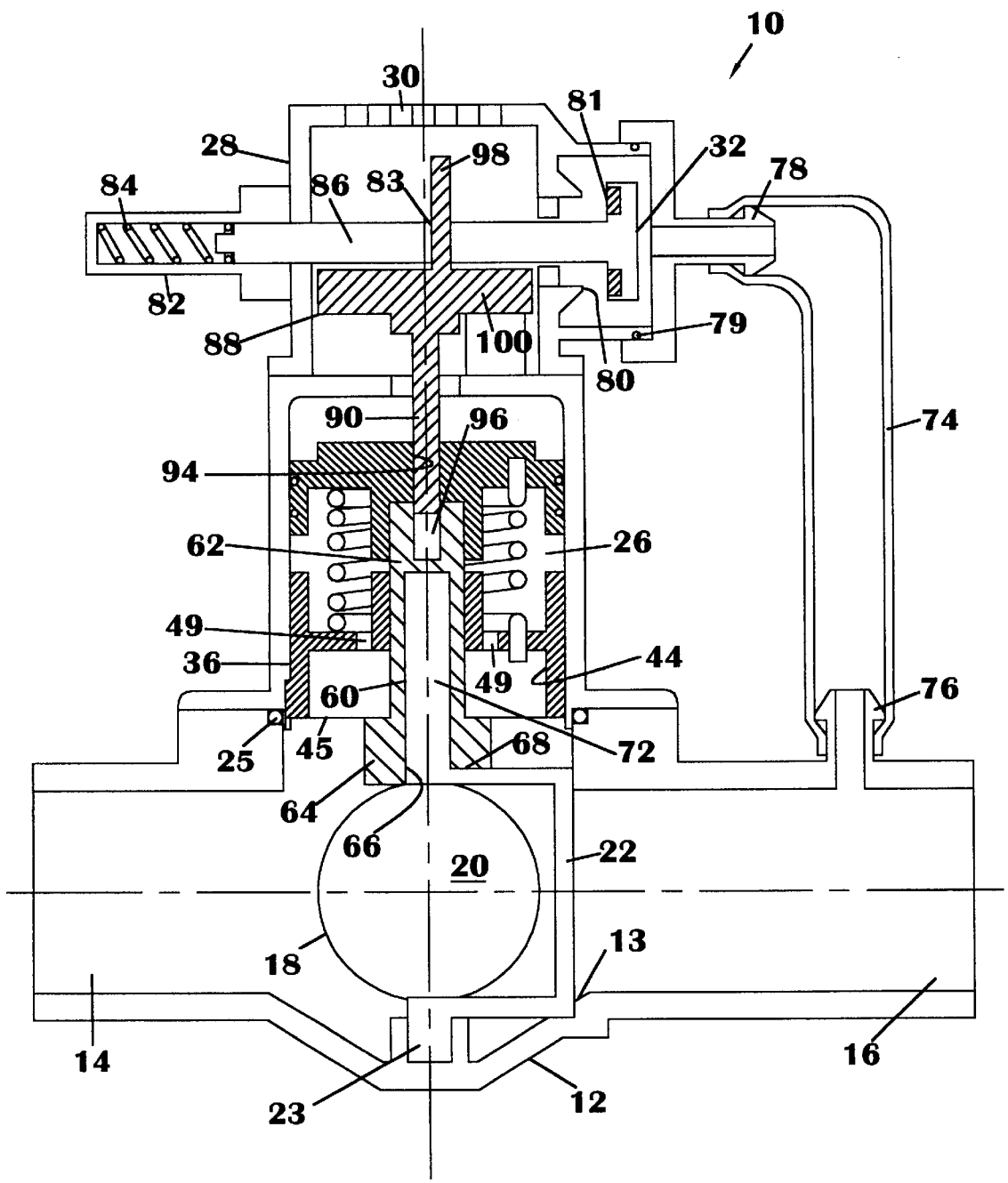
FIG. 3 is a side sectional elevation as in FIG. 2, but showing the device in a second operating mode, e.g., with the rotary plug in position preventing system flow and allowing vacuum-relief in the protected line.

As best seen in FIG. 1, piston head 64 includes a plug-mating surface 66 (having plural surface portions) which is configured to engage a piston-mating surface 68 (having plural surface portions) of rotary plug 22. Referring to FIGS. 2 and 3, piston shaft 62 has a cavity 70 open toward valve chamber 20 and configured to slidably engage the plug shaft 72 of rotary plug 22 and forms plug-mating surface 66 which engages piston-mating surface 68 of rotary plug 22. Rotary plug 22 includes a stub shaft 23 which is rotationally engaged with respect to valve body 12. Valve body 12 includes a plug stop 13 which limits the travel of rotary plug 22.

In highly preferred embodiments, a vacuum-relief line 74 extends from an air-intake nipple 76, located at a position upstream of valve chamber 20 on first inlet line 16, to a vacuum-relief discharge nipple 78 located on vacuum-relief housing 28. Vacuum-relief discharge nipple 78 is sealably secured with respect to vacuum-relief housing 28 by an o-ring 79. It can be appreciated that vacuum-relief line 74 may be mounted to any inlet line the user wishes to protect and is merely illustrated here on first inlet line 16 for purposes of explanation. Vacuum-relief housing 28 forms a valve seat 80 for vacuum-relief valve 32, air intake vents 30 which are open to atmosphere, and a valve stem housing 82 which supports a valve stem spring 84 and valve stem 86 of vacuum-relief valve 32. Vacuum-relief valve 32 further includes a valve seal 81 and an aperture 83 through valve stem 86.

In a highly preferred embodiment, the vacuum-relief housing 28 further serves to house a transfer member 88. Transfer member 88 includes a non-circular proximal end 90. Transfer member proximal end 90 extends through an opening 92 and into actuator housing 24. Vacuum-reactive member 36 includes a transfer member sleeve 94 configured to receive non-circular transfer member proximal end 90 in slidable engagement. Piston shaft 62 includes a transfer member cavity 96 configured to receive non-circular transfer member proximal end 90 in slidable engagement therewith. Transfer member 88 further includes a distal-end rod 98, a body portion 100, and a reset/override lever 101 attached to transfer member body portion 100 and extending out of vacuum-relief housing 28. Transfer member rod 98 is attached to transfer member body portion 100 at an off-axial position and extends axially through valve stem aperture 83.

As shown in FIG. 2, during normal operation rotary plug 22 is in an open position with respect to the protected line (in this case, inlet line 16) allowing flow therethrough and vacuum-relief valve 32 is in the closed position. When a blockage occurs in protected inlet line 16, system vacuum increases. The vacuum forces are transmitted to, and act upon, the vacuum-reactive member 48 via fluid communication ports 49. As the vacuum forces build, the vacuum-reactive member 48 is drawn toward base member 36, axially compressing spring 54. As reactive member 48 is drawn toward base member 36, piston 60 is also forced toward valve chamber 20, being restrained rotationally by guide 44 of base member 36. As piston 60 is further drawn toward valve chamber 20, plug-mating surfaces 66 of piston head 64 begin to engage piston-mating surfaces 68 of rotary plug 22.

As shown in FIG. 3, when the vacuum forces exceed a predetermined level, the vacuum forces will have drawn vacuum-reactive member 48 toward base member 36 to its limit of travel and piston head 64 will be fully engaged with rotary plug 22. At that time, piston head 64 will have traveled beyond terminal edge 45 of base member 36. When piston head 64 clears terminal edge 45 of base member 36, spring 54 rotates vacuum-reactive member 48 and piston 60, which rotates rotary plug 22. Travel of rotary plug 22 is limited to 90 degrees by stop 13 in valve body 12. The rotation of spring 54 also simultaneously rotates transfer member 88 to operate vacuum-relief valve 32.

Figure 4A:
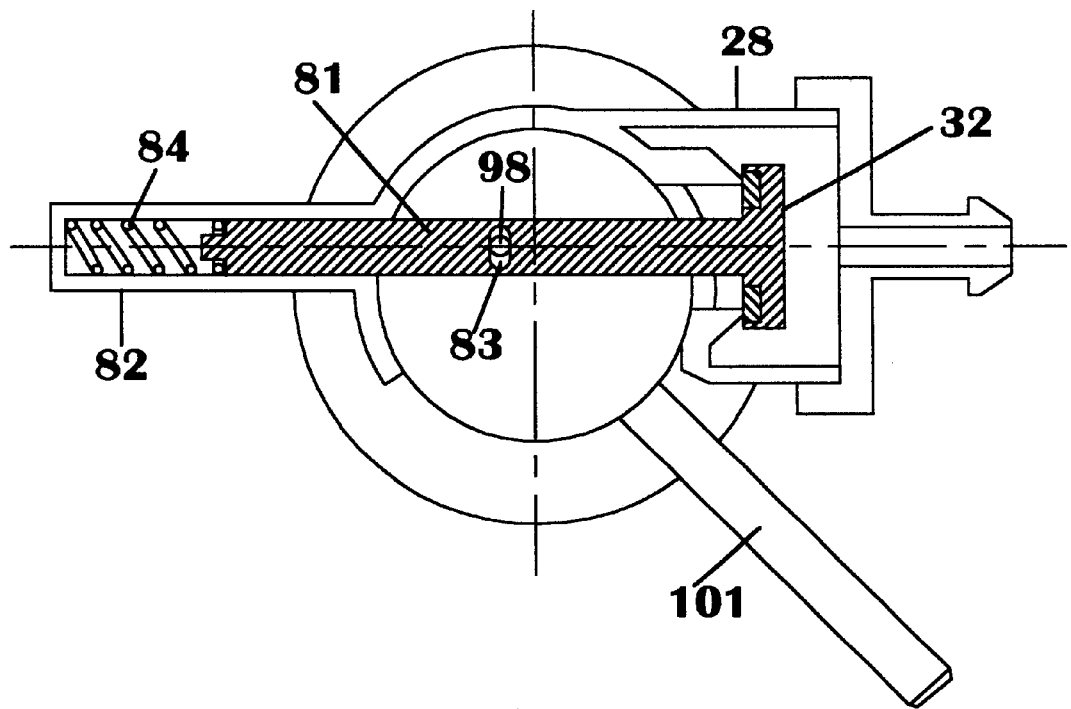
FIGS. 4a and 4b are fragmentary top views illustrating a portion of the device, i.e., the vacuum-relief valve in closed and open positions, respectively, and also illustrating the manual reset/override lever.
Figure 4B:
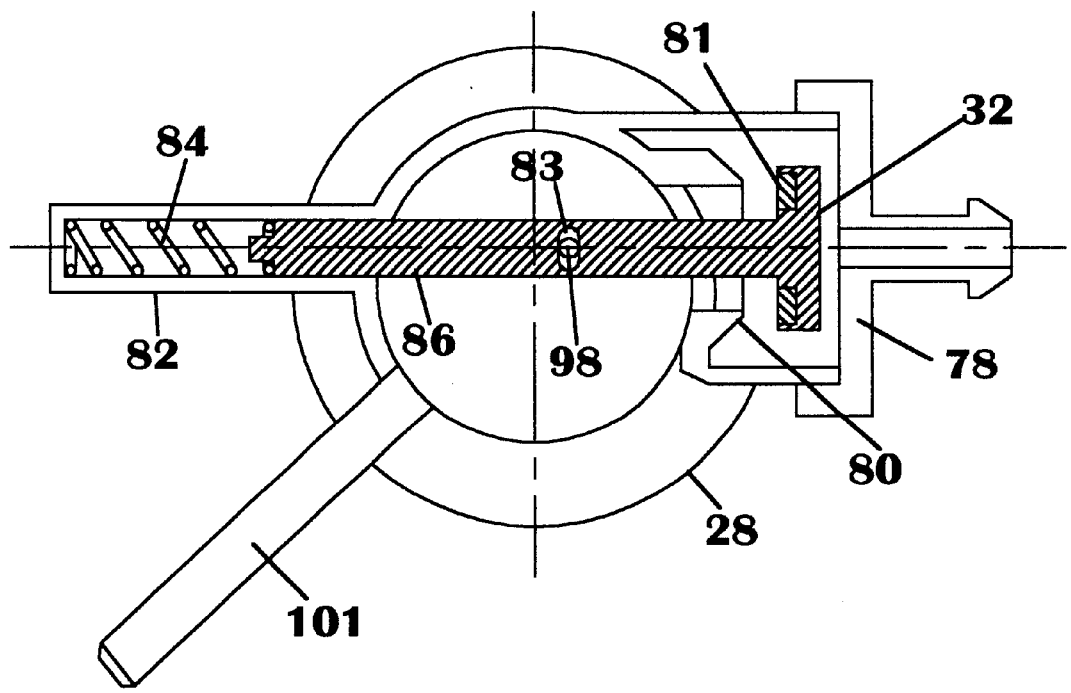

As best seen in FIGS. 4a and 4b, when transfer member 88 is rotated by vacuum-reactive member 48, vacuum-relief valve 32 is opened by the relative axial movement of transfer member rod 98 through valve stem aperture 83. When vacuum-relief valve is open, the vacuum remaining in inlet line 16 draws in equalizing air through air intake vents 30 and vacuum-relief line 74 to relieve inlet line 16 vacuum, as illustrated in FIG. 3.

Once shut-off valve 10 has been activated, it requires manual resetting by returning reset/override lever 101 to the ready position as shown in FIG. 4a. In resetting shut-off valve 10, rotating reset/override lever 101 back to the ready position also rotates vacuum-reactive member 48, spring 54, piston 60 and rotary plug 22. When piston 60 is rotated back 90°, piston head 64 is again rotationally aligned with guide 44 of base member 36. Once piston head 64 is in rotational alignment with guide 44, spring 54 is allowed to decompress axially, pulling vacuum-reactive member 48 and piston 60 toward vacuum-relief housing and thereby resetting shut-off valve 10. Vacuum-relief valve 32 is also simultaneously closed by the relative axial movement of the transfer member rod 98 during resetting of reset/override lever 101.

Reset/override lever 101 can also be used to manually-activate shut-off valve 10. As best seen in FIG. 5, to manually activate shut-off valve 10 a user pushes reset/override lever 101 toward valve chamber 20 (as illustrated, in a downwardly direction). When reset/override lever 101 is pushed downwardly, transfer member proximal end 90 slides through sleeve 94 of vacuum-reactive member 48 and into transfer member cavity 96 in piston shaft 62, pushing piston head 64 downwardly into mating engagement with rotary plug 22 and past terminal edge 45 of guide 44, thereby allowing spring 54 to rotate vacuum-reactive member 48, piston 60 and rotary plug 22 ninety degrees, shutting off protected inlet line from system vacuum. As described above during automatic operation, when transfer member 88 is rotated (in this case manually), relief-valve 32 is opened to allow equalizing air into protected inlet line 16 via vacuum-relief line 74.

The various parts illustrated herein and described above may be fabricated using a variety of materials known to those skilled in the art. Various assembly procedures can be used, and such would be apparent to those skilled in the art who are made aware of this invention.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed is:

1. In a rotary-plug shut-off valve for liquid suction systems which includes a multi-port valve body forming a valve chamber and having an outlet and first and second inlets, a rotary plug in the valve chamber, and an actuator to turn the plug, the improvement comprising:

an actuator housing affixed to the valve body adjacent to the plug and forming an actuator chamber communicating with the valve chamber;

a base member affixed to the actuator housing and forming (a) an end of the actuator chamber, (b) a sleeve, (c) a guide, and (d) a first spring-abutment;

a vacuum-reactive member within the actuator chamber, movable toward and away from the base member, and forming a second spring-abutment opposed to the first spring-abutment;

a spring in axial compression and rotational tension between the first and second spring-abutments and compressible by vacuum force on the vacuum-reactive member; and a piston affixed to the vacuum-reactive member, rotationally aligned with the plug, and having:

a shaft extending through the sleeve; and an anti-rotation structure which is (a) slidably engaged with the guide in one rotational alignment therewith in a normal operating range of axial positions with respect thereto and (b) out of sliding engagement with the guide beyond such normal operating range;

whereby the spring rotates the vacuum-reactive member and piston and thereby the plug from one inlet to the other inlet to close the other inlet, such rotation being by release of rotational tension in the spring when the anti-rotation structure of the piston moves out of sliding engagement with the guide.

2. The rotary-plug shut-off valve of claim 1 wherein the first and second inlets are at the ends of first and second inlet lines and further comprising:

a vacuum-relief line extending from one of the inlet lines upstream of the valve chamber to atmosphere; and a vacuum-relief valve in the vacuum-relief line;

whereby vacuum in the closed inlet line is relieved upon operation of the vacuum-relief valve.

3. The rotary-plug shut-off valve of claim 2 further including linkage between the actuator structure and the vacuum-relief valve to open the vacuum-relief valve upon rotation of the plug.

4. The rotary-plug shut-off valve of claim 3 wherein:

the vacuum-relief valve includes a valve head and a stem attached thereto; and the linkage includes a transfer member having proximal and distal end portions, the proximal end portion engaged with the vacuum-reactive member and the distal end portion engaged with the stem.

5. The rotary-plug shut-off valve of claim 4 further comprising a vacuum-relief housing attached to the actuator housing and forming (a) a valve seat for the vacuum-relief valve and (b) air intake vents.

6. The rotary-plug shut-off valve of claim 4 further comprising a reset lever attached to the transfer member for manual resetting of the rotary-plug shut-off valve by rotating the transfer member and thereby the vacuum-reactive member and in doing so restoring rotational tension to the spring.

7. The rotary-plug shut-off valve of claim 4 wherein the proximal end portion of the transfer member is in rotational alignment and slidable engagement with the vacuum-reactive member along the axis thereof.

8. The rotary-plug shut-off valve of claim 7 wherein:

the stem has an aperture therethrough; and the distal end of the transfer member includes a rod axially offset from the axis of the vacuum-reactive member and extending into the aperture, whereby rotation of the transfer member moves the stem to operate the vacuum-relief valve.

9. The rotary-plug shut-off valve of claim 1 wherein the plug and the piston have first and second non-rotational mating surfaces, respectively, holding the piston and the plug in fixed rotational orientation with respect to one another at least when the anti-rotation structure of the piston is out of sliding engagement with the guide of the base member, whereby rotation of the piston rotates the plug.

10. The rotary-plug shut-off valve of claim 9 wherein:

the first non-rotational mating surface is a piston-mating surface on the plug outside the actuator chamber; and the piston has a piston head outside the actuator chamber and the second non-rotational mating surface is a plug-mating surface on the piston head which is configured to engage the piston-mating surface of the plug such that rotation of the piston rotates the plug.

11. The rotary-plug shut-off valve of claim 1 wherein:

the anti-rotation structure of the piston is a piston head outside the actuator chamber; and the guide of the base member faces the valve chamber and is shaped to receive the piston head in said one rotational alignment therewith.

12. The rotary-plug shut-off valve of claim 11 wherein the piston head and the plug have plug-mating and piston-mating surfaces, respectively, holding the piston and the plug in fixed rotational orientation with respect to one another at least when the anti-rotation structure of the piston is out of sliding engagement with the guide of the base member, whereby rotation of the piston rotates the plug.

13. The rotary-plug shut-off valve of claim 12 wherein the first and second inlets are at the ends of first and second inlet lines and further comprising:

a vacuum-relief line extending from one of the inlet lines upstream of the valve chamber to atmosphere; and a vacuum-relief valve in the vacuum-relief line.

14. The rotary-plug shut-off valve of claim 13 further including linkage between the actuator structure and the vacuum-relief valve to open the vacuum-relief valve upon rotation of the plug.

15. The rotary-plug shut-off valve of claim 14 wherein:

the vacuum-relief valve includes a valve head and a stem attached thereto; and the linkage includes a transfer member having proximal and distal end portions, the proximal end portion engaged with the vacuum-reactive member and the distal end portion engaged with the stem.

16. The rotary-plug shut-off valve of claim 15 further comprising a vacuum-relief housing attached to the actuator housing and forming (a) a valve seat for the vacuum-relief valve and (b) air intake vents.

17. The rotary-plug shut-off valve of claim 15 further comprising a reset lever attached to the transfer member for manual resetting of the rotary-plug shut-off valve by rotating the transfer member and thereby the vacuum-reactive member and in doing so restoring rotational tension to the spring.

18. The rotary-plug shut-off valve of claim 15 wherein the proximal end portion of the transfer member is in rotational alignment and slidable engagement with the vacuum-reactive member along the axis thereof.

19. The rotary-plug shut-off valve of claim 18 wherein:

the stem has an aperture therethrough; and the distal end of the transfer member includes a rod extending into the aperture and offset from the axis of the vacuum-reactive member;

whereby rotation of the transfer member moves the stem to operate the vacuum-relief valve.

20. In a rotatory-plug shut-off valve for liquid suction systems which includes a multi-port valve body forming a valve chamber and having an outlet and first and second inlets, a rotary plug in the valve chamber, and an actuator to turn the plug, the improvement comprising:

an actuator housing affixed to the valve body adjacent to the plug and forming an actuator chamber communicating with the valve chamber;

a base member attached to the actuator housing in fixed axial position and forming (a) an end of the actuator chamber, (b) a sleeve, (c) a guide, and (d) a first spring-abutment;

a vacuum-reactive member within the actuator chamber, movable toward and away from the base member, and supported by spring pressure at a position away from the base member such that it is movable toward the base member by sufficient vacuum force on the vacuum-reactive member;

a piston attached to the vacuum-reactive member, rotationally aligned with the plug, and having a (a) shaft extending through the sleeve and (b) an anti-rotation structure which is (1) slidably engaged with the guide in one rotational alignment therewith in a normal operating range of axial positions with respect thereto and (2) out of sliding engagement with the guide beyond such normal operating range; and a spring in rotational tension positioned and secured to rotate at least the piston and thereby rotate the plug from one inlet to the other inlet to close the other inlet, such rotation being by release of rotational tension in the spring when the piston anti-rotation structure moves out of sliding engagement with the guide.

21. In a rotary-plug shut-off valve for liquid suction systems which includes a multi-port valve body forming a valve chamber and having an outlet and first and second inlets from first and second inlet lines, respectively, a rotary plug in the valve chamber, and an actuator to turn the plug, the improvement comprising:

an actuator housing affixed to the valve body adjacent to the plug;

a vacuum-sensing-and-reacting device secured with respect to the actuator housing and in communication with the valve chamber;

an actuator in the actuator housing, engageable with the rotary plug, and linked for control to the vacuum-sensing-and-reacting device hereby to rotate the plug from one inlet to the other inlet to close the other inlet when the vacuum-sensing-and-reacting device senses excessive vacuum;

a vacuum-relief line extending from the first inlet line to atmosphere; and a vacuum-relief valve in the vacuum-relief line;

whereby vacuum in the closed inlet line is relieved upon operation of the vacuum-relief valve.

* * * * *